(12) United States Patent
Liu et al.

(10) Patent No.: US 8,462,686 B2
(45) Date of Patent: Jun. 11, 2013

(54) APPARATUS FOR COLLISION MITIGATION OF MULTICAST TRANSMISSIONS IN WIRELESS NETWORKS

(75) Inventors: Hang Liu, Yardley, PA (US); Ishan Mandrekar, Monmouth Junction, NJ (US); Mingquan Wu, Monmouth Junction, NJ (US); Ramkumar Perumanam, Carmel, NJ (US); Saurabh Mathur, Monmouth Junction, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 22 days.

(21) Appl. No.: 12/737,226

(22) PCT Filed: Jun. 30, 2008

(86) PCT No.: PCT/US2008/008162
§ 371 (c)(1),
(2), (4) Date: Dec. 20, 2010

(87) PCT Pub. No.: WO2009/157910
PCT Pub. Date: Dec. 30, 2009

(65) Prior Publication Data
US 2011/0096711 A1 Apr. 28, 2011

Related U.S. Application Data

(63) Continuation-in-part of application No. PCT/US2008/007811, filed on Jun. 23, 2008.

(51) Int. Cl.
*H04H 20/71* (2008.01)
(52) U.S. Cl.
USPC ..................................................... 370/312

(58) Field of Classification Search
USPC ................ 370/310, 312, 351, 389, 390, 392,
370/393, 229, 235, 236, 241, 252
See application file for complete search history.

(56) References Cited

U.S. PATENT DOCUMENTS 4,760,572 A * 7/1988 Tomikawa .................... 370/390
5,592,483 A 1/1997 Hieda et al.
(Continued)

FOREIGN PATENT DOCUMENTS

EP 1686730 8/2006
JP 11196088 7/1999
(Continued)

OTHER PUBLICATIONS

IEEE 802.11, http://en.wikipedia.org/wiki/IEEE_802.11, Wikipedia, retrieved Jul. 11, 2012, all pages.*

(Continued)

*Primary Examiner* — Omar Ghowrwal
(74) *Attorney, Agent, or Firm* — Robert D. Shedd; Jerome G. Schaefer (57) ABSTRACT

Message formats and apparatus are described that reserve access to a communication medium in a multicast system. A first message, a multicast request-to-send message, includes a duration field having information representing the reserved time for a communication medium, multicast receiver and transmitter address fields, and bits that specifies a destination that is expected to reply to the multicast digital message. The bits that specify a destination can be extended to a plurality of fields that each contain different destination identifiers. Example destination identifiers include association identifiers or media access control addresses. Alternately, the bits that specify a destination can have a first field containing an offset and a second field indicating destinations with respect to the offset. A second message includes a duration field and multicast receiver and transmitter address fields. The second message is used to cancel a data transmission resulting from a multicast request-to-send message.

8 Claims, 10 Drawing Sheets

| FRAME CONTROL | DURATION | RA | TA | BITMAP CONTROL | PARTIAL VIRTUAL BITMAP | FCS |

U.S. PATENT DOCUMENTS

| | | | |
|---|---|---|---|
| 5,901,362 A | 5/1999 | Cheung et al. | |
| 6,411,290 B1 | 6/2002 | Sasaki | |
| 7,349,349 B2 | 3/2008 | Acharya et al. | |
| 7,613,202 B2 | 11/2009 | Doi et al. | |
| 7,657,276 B2 | 2/2010 | Sakoda | |
| 7,907,627 B2 | 3/2011 | Yang et al. | |
| 8,009,596 B2 | 8/2011 | Tomioka | |
| 2002/0071448 A1 | 6/2002 | Cervello et al. | |
| 2002/0152324 A1* | 10/2002 | Sherman | 709/245 |
| 2003/0153339 A1 | 8/2003 | Crockett et al. | |
| 2003/0227934 A1 | 12/2003 | White et al. | |
| 2006/0013179 A1 | 1/2006 | Yamane | |
| 2006/0109859 A1 | 5/2006 | Acharya et al. | |
| 2006/0114867 A1 | 6/2006 | Du et al. | |
| 2006/0126494 A1 | 6/2006 | Dougall et al. | |
| 2006/0154603 A1 | 7/2006 | Sachs et al. | |
| 2006/0165114 A1 | 7/2006 | Diepstraten et al. | |
| 2007/0002887 A1 | 1/2007 | Benveniste | |
| 2007/0016637 A1 | 1/2007 | Brawn et al. | |
| 2007/0258466 A1 | 11/2007 | Kakani | |
| 2007/0268884 A1 | 11/2007 | Kolavennu et al. | |
| 2008/0002591 A1 | 1/2008 | Ueno | |
| 2008/0004076 A1* | 1/2008 | Adachi et al. | 455/560 |
| 2008/0063106 A1 | 3/2008 | Hahm et al. | |
| 2008/0267181 A1 | 10/2008 | Monga et al. | |
| 2009/0067389 A1 | 3/2009 | Lee et al. | |
| 2011/0310871 A1* | 12/2011 | Fischer et al. | 370/338 |

FOREIGN PATENT DOCUMENTS

| | | |
|---|---|---|
| JP | 2002521864 | 7/2002 |
| JP | 2005236923 | 9/2005 |
| JP | 2006020290 | 1/2006 |
| JP | 2006060408 | 3/2006 |
| JP | 2006270914 | 10/2006 |
| JP | 2007150840 | 6/2007 |
| JP | 2007158765 | 6/2007 |
| JP | 2008017306 | 6/2008 |
| JP | 2008141372 | 6/2008 |
| RU | 2121762 | 11/1998 |
| RU | 2316146 | 1/2008 |
| RU | 74232 U1 | 6/2008 |
| WO | WO9952077 | 10/1999 |
| WO | WO0004677 | 1/2000 |
| WO | WO03062955 A2 | 7/2003 |
| WO | WO2004023736 | 3/2004 |
| WO | WO2005041467 | 5/2005 |
| WO | WO2005057332 | 6/2005 |
| WO | WO2006015252 | 2/2006 |
| WO | WO2006043161 | 4/2006 |
| WO | WO2006133415 | 12/2006 |
| WO | WO2007038118 | 4/2007 |
| WO | WO2007052143 | 5/2007 |
| WO | WO2007053299 | 5/2007 |
| WO | WO2007078073 | 7/2007 |
| WO | WO2007081683 | 7/2007 |
| WO | WO2007122503 | 11/2007 |
| WO | WO2008020731 | 2/2008 |

OTHER PUBLICATIONS

Search Report dated Apr. 14, 2009.

Tang et al., "MAC Layer Broadcast Support in 802.11 Wireless Networks", MILCOM 2000. 21st Century Military Communications Conference Proceedings, vol. 1, Oct. 22-25, 2000, pp. 544-548.

Wang et al., "Opportunistic Media Access Control and Rate Adaptation for Wireless Ad Hoc Networks", 2004 IEEE International Conference on Communications, vol. 1, Paris France, Jun. 20-24, 2004, pp. 154-158.

IEEE, "IEEE Standard for Information Technology—Telecommunications and Information Exchange Between Systems—Local and Metropolitan Area Networks—Specific Requirements" Part 11: Wireless LAN Medium Access Control (MAC) and Physical Layer (PHY) Specifications. Amendment 8: Medium Access Control (MAC) Quality of Service Enhancements. IEEE Std 802.11e—2005.

* cited by examiner

| FRAME CONTROL | DURATION | RA | FCS |
|---|---|---|---|

APPARATUS FOR COLLISION MITIGATION OF MULTICAST TRANSMISSIONS IN WIRELESS NETWORKS

REFERENCE TO RELATED APPLICATIONS

This application claims the benefit, under 35 U.S.C. §365, of International Application PCT/US08/08162 filed Jun. 30, 2008 which was published in accordance with PCT Article 21(2) on Dec. 3, 2009 in English and which is a continuation-in-part of and claims the benefit of PCT/US08/07811 filed Jun. 23, 2008.

FIELD OF THE INVENTION

The present invention relates generally to wireless communication and specifically to messages and an apparatus to transmit and receive messages for reducing the collision probability for multicast in wireless local area networks.

BACKGROUND OF THE INVENTION

As used herein, "/" denotes alternative names for the same or similar components or structures. That is, a "/" can be taken as meaning "or" as used herein. Unicast transmissions are between a single sender/transmitter and a single receiver. Broadcast transmissions are between a single sender/transmitter and all receivers within receiving range of the transmitter. Multicast transmissions are between a single sender/transmitter and a subset of the receivers within receiving range of the transmitter where the subset of receivers with receiving range of the transmitter may be the entire subset. That is, multicast may include broadcast and is therefore a broader term than broadcast as used herein. Data is transmitted in packets or frames.

In wireless local area networks, an access point (AP)/station (STA)/mobile device/mobile terminal/node transmits multicast and broadcast frames immediately after it determines that the wireless medium/channel is idle/clear using a physical and virtual carrier sense process with a random backoff time. Therefore, collisions may occur when multiple STAs attempt to transmit simultaneously. For example, an access point and its associated STAs may transmit simultaneously and then all the transmitted frames are lost due to collision. For example, when an AP sends multicast data frames to several of its associated STAs, another STA may send its data or control frames to the AP. The AP with its associated stations is called a basic service set (BSS). Collisions occurring within a BSS are called intra-BSS collisions. In another example, AP1 and AP2 operate on the same channel/frequency and the two BSSs overlap. AP1 transmits data frames to its associated STAs. However, AP2 cannot hear AP1's transmission and thinks that the medium is idle. AP1 is a "hidden node" to AP2. AP2 may transmit frames to its associated STAs while AP1 is transmitting. But there are STAs that are in the interference range of both AP1 and AP2 so that the transmitted frames from AP1 and AP2 are lost at the STAs due to collision. This type of collision is called overlap BSS collision or inter-BSS collision.

In one prior art scheme, a time-division multiple access (TDMA) method was described, where each STA scheduled its transmissions using TDMA time slots (time periods). However, this mechanism required synchronization among the STAs and did not scale well as the number of STAs increased. In another prior art scheme, in order to solve inter-BSS collision, each access point scheduled its multicast and broadcast transmissions in a TDMA fashion using beacons. This method also required synchronization among BSSs.

US 2006/0109859 METHOD AND SYSTEM FOR EFFICIENT AND RELIABLE MAC-LAYER MULTICAST WIRELESS TRANSMISSIONS by Acharya et al. (hereinafter "Acharya") describes a method for reliable multicasting in a wireless network. A sender node transmits a Request-to-Send (RTS) signal to the receiver nodes. The RTS signal includes a set of identifiers corresponding to the receiver nodes. The Clear-to-Send (CTS) signals and acknowledgment (ACK) signals are sent from the receiver nodes according to an order function of the set of identifiers. In this approach, a data packet is sent from the sender node to the receiver nodes. One or more ACK signals are sent from one or more of the receiver nodes according to an ordering function of the set of identifiers in the RTS signal if a data packet is received correctly. This approach uses a four-way handshake to send a single data packet. It incurs high overhead. In the present invention, a RTS/CTS exchange reserves the channel for transmitting multiple multicast packets. Acharya does not send multiple multicast packets. The method of Acharya multicasts a single packet at a time. That means a great deal of overhead to multicast a single packet. In sharp contrast, the present invention reserves a time period TXOP to send multiple packets of data. That is, the present invention transmits multiple packets within the same TXOP. These packets may or may not be acknowledged. If they are acknowledged, they can be acknowledged together in a block. Furthermore, the reserved TXOP can be cancelled if the sender decides not to transmit after reservation. Therefore, the signaling overhead for transmission is reduced and the network throughput is improved with the present invention.

In another embodiment of Acharya, a bit vector, instead of a set of label identifiers, is included in the RTS. Each bit in the bit-vector indicates a recipient node. However, an AP may have a large number of associated stations, or a sending node may have a large number of neighbor nodes. If the RTS signal includes a set of identifiers corresponding to the receiver nodes or a bit-vector, the RTS signal may become large, leading to more overhead. In sharp contrast, the present invention describes using a bitmap control field and a partial virtual bitmap to reduce the overhead.

It would be advantageous to have a method and apparatus to solve intra-BSS collisions and inter-BSS collisions for multicast transmissions that did not require synchronization, reduce the signaling overhead to transmit data/packets/frames, and improve the network throughput. The present invention solves both intra-BSS collisions and inter-BSS collisions.

SUMMARY OF THE INVENTION

The present invention is directed to formats and apparatus used to reserve a communication medium and distribute the medium reservation information for multicast and broadcast transmissions in wireless local area networks. As a result, the collision probability for multicast and broadcast transmissions is reduced and transmissions are protected.

Message formats and apparatus are described to reserve access to a communication medium in a multicast system. A first message, a multicast request-to-send message, includes a duration field having information representing the reserved time for a communication medium, multicast receiver and transmitter address fields, and bits that specify a destination that is expected to reply to the multicast digital message. The bits that specify a destination can be extended to a plurality of fields that each contain different destination identifiers.

Example destination identifiers include association identifiers or media access control addresses. Alternately, the bits that specify a destination can have a first field containing an offset and a second field containing destinations with respect to the offset. A second message includes a duration field and multicast receiver and transmitter address fields. The second message is used to cancel a data transmission resulting from a multicast request-to-send message.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

In IEEE 802.11-based wireless local area networks, Carrier Sense Multiple Access with Collision Avoidance (CSMA/CA) is used for an access point (AP)/station (STA)/device/receiver/mobile device/mobile station/mobile terminal/node to access medium to transmit. In the following, unless otherwise specified, STAs include APs. In CSMA, an STA wishing to transmit first listens to the wireless medium/channel for a certain amount of time (an inter-frame interval/space plus a random backoff time following a busy medium condition), in order to check for any activity on the medium. If the medium is sensed "idle/clear" then the STA is permitted to transmit. If the medium is sensed as "busy" the STA has to defer its transmission. In CSMA, multiple STAs may transmit simultaneously, resulting in collisions. It should be noted that as used herein a mobile device includes but is not limited to a dual mode smart phone, a computer, a laptop computer, a notebook computer, a personal digital assistant (PDA) or any other device that can communicate using any part or portion of the wireless spectrum (airwaves).

Figure 1:
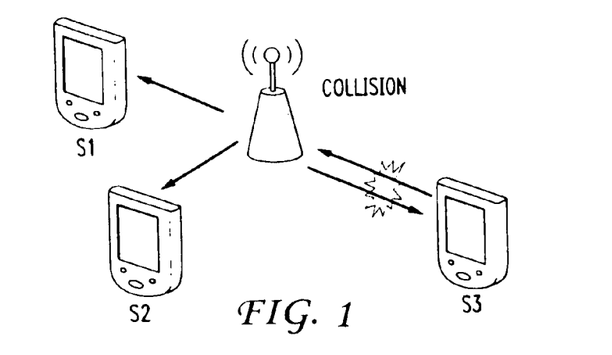
FIG. 1 is a schematic diagram of stations associated with an access point and showing collisions within a basic service set.
Figure 2:
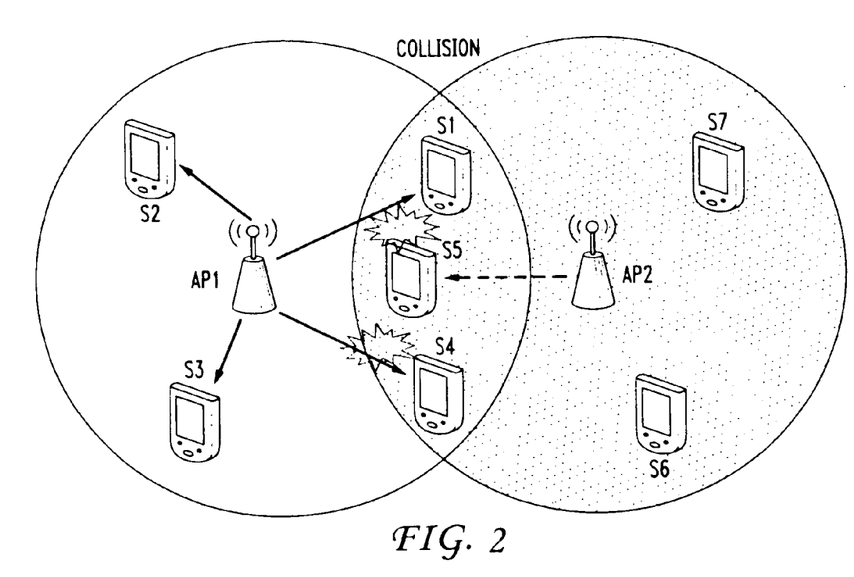
FIG. 2 is a schematic diagram showing collisions involving multiple basic service sets.

As shown in FIG. 1, stations associate with an AP. The AP with its associated stations forms a basic service set (BSS). As an example, if the AP and one or more of its associated STAs transmit simultaneously after sensing the medium idle/clear, the frames/packets transmitted by the AP and STAs collide and are lost. This type of collision occurs within the BSS and is called an intra-BSS collision. Another type of collision is shown in FIG. 2. AP1 and AP2 operate on the same channel/frequency and overlap. The intersection of the circles represents the interference range of AP1 and AP2. AP1 transmits data frames to its associated STAs, e.g. to STA S4 or STA S1. AP2 cannot hear AP1's transmission and thinks that the medium is idle. AP1 is a "hidden node" to AP2. AP2 may transmit frames to its associated STA S5 while AP1 is transmitting. Therefore, a collision occurs at STAs S1, S4 and S5, and STAs S1, S4 and S5 cannot receive the frames/data correctly. This type of collision is between BSSs and is called an inter-BSS collision.

In order to reduce collision probability between and among multiple STAs, a collision avoidance mechanism is used for unicast in IEEE 802.11 WLANs by reserving the medium for a period of time before transmitting actual data frames. It is also called virtual carrier-sense mechanism. When one STA wants to transmit to another STA, it senses the carrier. Carrier sensing includes both physical carrier sensing and virtual carrier sensing. Virtual carrier sensing indicates whether other STAs have reserved the medium. In carrier sensing (both physical carrier sensing and virtual carrier sensing), once the channel is idle/clear and the STA is permitted to transmit, an originating STA may send a request-to-send (RTS) frame to the receiving/destination STA. The receiving STA will reply with a clear-to-send (CTS) frame if the medium is also idle at the receiver. Only after receiving the CTS, does the originating STA start actual data frame transmission. If the originating STA does not receive the CTS reply, the originating STA may repeat the carrier sense and medium access process with a backoff time. The exchange of RTS and CTS occurs before actual data frame transmission. It reserves the medium for the following data transmission by telling all other STAs not to transmit over the wireless medium during the reserved duration that is specified in the duration field of the RTS and CTS frames. All STAs within the receiving range of either the originating STA or the destination STA learn of the medium reservation through the RTS or the CTS frames. Thus, even if a hidden STA cannot receive the RTS from the originating STA, it may still learn from the CTS about the impending use of the medium to transmit frames. For the above example in FIG. 2, AP2 will learn of the AP1's medium reservation from the CTS transmitted by STA S1 and will not transmit during the time period reserved by AP1

However, in IEEE 802.11 WLANs, the collision avoidance mechanism cannot be used for broadcast and multicast. The reason is that there are multiple destinations for the RTS, and then potentially multiple concurrent senders of the CTS in response. Therefore, these CTS signals collide at the originating STA and the originating STA cannot receive the CTS successfully and initiate the following data frame transmission or frame exchange. The multicast and broadcast frames are sent immediately after carrier sense process without medium reservation in IEEE 802.11 WLANs. In the present invention, a multicast and broadcast collision avoidance mechanism is described. The mechanism reserves the medium and distributes the medium reservation information for the broadcast and multicast transmission. Broadcast is a special multicast that addresses all stations.

The present invention can be illustrated by the following examples. When a STA, e.g. an AP, wants to transmit multicast or broadcast frames to multiple receivers/destinations/devices, it performs carrier sense using CSMA. Unless otherwise specified, the carrier sense includes the physical and virtual carrier sense to make sure that the medium is physically idle with a certain time and the medium is not reserved by other STAs. Once the transmitting/originating STA successfully performs carrier sense and is ready to transmit, it transmits a signal such as a control/management frame to reserve the medium prior to the transmission of actual multicast and broadcast frames. This signal is called a multicast/broadcast request-to-send (MB-RTS) herein.

Figure 3A:
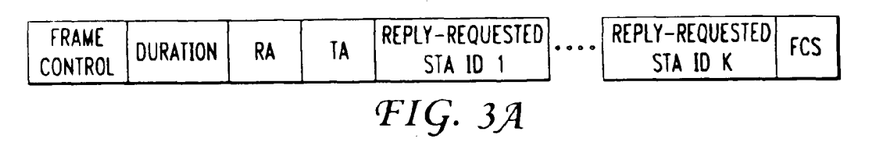
FIG. 3A depicts an exemplary format of a MB-RTS frame/message/signal.

The MB-RTS frame/message/signal contains a frame control field, a duration/ID field, a receiver address (RA) field, a transmitter address (TA) field, a list of reply-requested destinations/stations from which this MB-RTS requests a reply, a frame check sequence (FCS) field, etc. As used herein slots are time slots or time periods. FIG. 3A depicts an exemplary format of a MB-RTS frame/message/signal. The frame control field identifies the frame type, frame subtype and flags. The duration/ID field gives the time period for which the originating STA desires to reserve the medium. The RA field indicates the medium access control (MAC) address of the intended receivers/destinations. It is a multicast or broadcast address. The TA field indicates the MAC address of the transmitter/originating STA. The FCS field is used by the receiver to determine if there is error in the received frame.

One of differences between the MB-RTS frame/message/signal of the present invention and the IEEE 802.11 RTS is that the MB-RTS frame/message/signal contains a list of reply-requested destinations/stations/receivers from which this MB-RTS frame/message/signal requests a reply. If a station successfully associates with an AP, it will obtain an association identifier (AID). The list of reply-requested stations can be in the form of a list of the AIDs of the stations from which a reply is requested (reply-requested stations). In an alternative embodiment, the list of reply-requested stations can be in the form of a list of the media access control (MAC) addresses of the stations from which this MB-RTS frame/message/signal requests a reply.

Figure 3B:
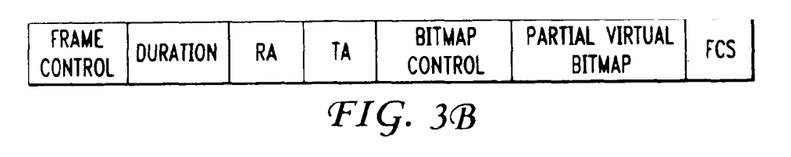
FIG. 3B depicts an exemplary format of a MB-RTS frame/message/signal using a bitmap control field and a partial virtual bitmap.

In an alternative embodiment, the MB-RTS signal/frame/message contains a frame control field, a duration/ID field, a receiver address (RA) field, a transmitter address (TA) field, a bitmap control field, a partial virtual bitmap, a frame check sequence (FCS) field, etc. The bitmap control field and partial virtual bitmap can be used to discern/determine a list of the reply-requested destinations/stations/receivers from which this MB-RTS frame/message/signal requests a reply. FIG. 3B shows an exemplary format of a MB-RTS frame/signal/message for this embodiment. The bitmap control field is a single octet. 7 bits of the field (bits 1-7) form the bitmap offset. One bit (bit 0) is reserved. The length of the partial virtual bitmap varies and is multiples of octets, which can be determined from the total frame size. The bitmap offset subfield value contains the base AID divided by 16. If its value is N, the stations with AID less than 16×N are not included in the list of the stations that are requested to reply to this MB-RTS message/signal/frame. Each bit in the partial virtual bitmap field corresponds to a specific station. Bit number i ($0 \leq i \leq 2007$) in the bitmap field, i.e. bit number (i mod 8) in octet number $\lfloor i/8 \rfloor$ in the bitmap field where the low-order bit of each octet is bit number 0 and the high order bit is bit number 7, corresponds to the station with an AID of 16×N+i. If bit i in the bitmap field is set to 1, then the station with AID 16×N+i is in the list of the reply-requested stations that are requested to reply to this MB-RTS signal/frame/message, where N is the bitmap offset field value. If the length of partial virtual bitmap field is L octets, stations with AID equal to or greater than 16×N+8×L are not in the list of reply-requested stations.

As an example, the value of bitmap control field is 50. The size of partial virtual bitmap in the MB-RTS is 2 octets. The bitmap is 10111111 01111111. All the stations with AID less than 16×50=800 will not send a MB-CTS frame/message/signal because they are not addressed (requested to reply) in the MB-RTS frame/message/signal. The stations with AID greater than or equal to 800+2×8=816 will not send a MB-CTS frame/message/signal. The ith position in the partial virtual bitmap of the MB-RTS frame/message/signal indicates the station with an AID of 800+i. Based on the bit pattern 10111111 01111111, the stations with the AID equal to 800, 802, 803, 804, 805, 806, 807, 809, 810, 811, 812, 813, 814, 815 will send the MB-CTS frame/message/signal in order because their corresponding bits are set to 1. However, the stations with the AID equal to 801 and 808 will not send MB-CTS frame/message/signal because their corresponding bits are set to 0. Note that by using the bitmap control field and partial virtual bitmap, three octets are needed to represent the receiver stations that are requested to reply to the MB-RTS frame/message/signal with a MB-CTS frame/message/signal. It is possible that a set of 16-bit identifiers are included in the MB-RTS to indicate the recipient stations from which a MB-CTS reply is requested. However, in this case, the MB-CTS frame/message/signal would require 14 octets. If just a bit-vector is used in the MB-RTS frame/message/signal to indicate the stations from which a reply is requested using a MB-CTS frame/message/signal, it would require at least 12 octets. Therefore, the bitmap control field and partial virtual bitmap of the present invention further reduces the overhead required for the MB-RTS signal/frame/message.

Figure 4:
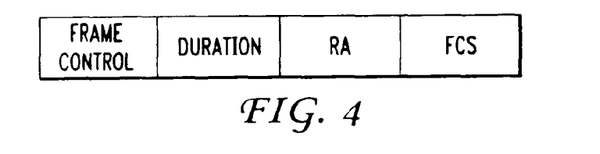
FIG. 4 shows an exemplary format of a MB-CTS frame.

After a multicast/broadcast receiver/device receives a MB-RTS frame/message/signal, it determines whether it is in the list of stations requested to reply to the MB-RTS frame/message/signal. A station that has determined that it is in the list of stations requested to reply to the received MB-RTS frame/message/signal sends a reply signal, i.e. a control/management frame to respond to the MB-RTS frame/message/signal if the receiving station also determines that the medium is idle through physical carrier sensing and virtual carrier sensing. This reply is called as multicast/broadcast clear-to-send (MB-CTS) frame/signal/message. The virtual carrier sensing determines whether the medium has been reserved by another STA for pending transmissions. The channel clear or idle means that the physical medium is idle without any ongoing transmission and no other STA has reserved the channel. An MB-CTS frame/message/signal contains a frame control field, a duration/ID field, a receiver address (RA), a frame check sequence (FCS). The frame control field identifies the frame type, frame subtype and flags. The duration/ID field gives the remaining time for which the medium is reserved. The RA field indicates the MAC address of the intended receivers/destinations, which is the MAC address of the MB-RTS originator. FIG. 4 depicts an exemplary format of a MB-CTS frame/message/signal. A station does not reply if it is not in the list of reply-requested stations of the MB-RTS frame/message/signal or if the station determines that the medium is busy. When either physical carrier sensing or virtual carrier sensing indicates a busy medium, the medium is considered busy.

Following MB-RTS message/signal/frame transmission, there is a MB-CTS transmission time period (MCP). The MCP includes an integral number of transmission slots, each slot for transmitting a MB-CTS frame/signal/message. The number of slots is the number of reply-requested stations in the MB-RTS frame/signal/message. A reply-requested station that intends to send a MB-CTS frame/signal/message transmits its MB-CTS in the order listed in the MB-RTS frame/signal/message or MB-RTS partial virtual bitmap field. If a reply-requested station does not send the MB-CTS due to determining that the medium is busy or incorrect reception of the MB-RTS frame/signal/message, the particular MB-CTS slot for this station in the MCP is idle.

The originating STA of MB-RTS frame/signal/message may receive multiple MB-CTS messages/frames/signals from the multicast/broadcast receivers in the reply-requested list of the MB-RTS frame/signal/message. K is the number of the reply-requested stations specified in the reply-requested STA identifier list or the bitmap control with the partial virtual bitmap of the MB-RTS, i.e. the number of MB-CTS frames/signals/messages that the originating STA expects to receive if every reply-requested STA transmits the MB-CTS successfully. $T_h$ is the threshold for using the reserved TXOP. If the originating STA receives M MB-CTS frames/signals/messages during the MCP period and $M/K \geq T_h$, the originating STA can use the remaining time that it reserved for the medium access in its original MB-RTS to transmit pending multicast/broadcast data or management frames or initiate pending frame exchanges. The frame exchanges include the originating STA sending multicast/broadcast frames/packets and the multicast/broadcast receivers sending responses (if there is any response, e.g. acknowledgement). Otherwise, the originating STA repeats the carrier sense and medium reservation procedure with a backoff time. $T_h$ is a configurable parameter that has an impact on the tradeoff of multicast reliability and medium utilization. In a special case, $T_h=1$, the originating STA can use the remaining time that it reserved for the medium access in its original MB-RTS frame/signal/message only if it receives the MB-CTS frames/signals/messages from all the reply-requested STAs. In another special case, $T_h=1/K$, the originating STA can use the remaining duration of time that it reserved for the medium access in its original MB-RTS frame/signal/message if at least one MB-CTS frame/signal/message is received during the MCP period. The former case results in a higher multicast reliability by reserving the medium more reliably, but may cause lower channel usage efficiency than the latter case.

The exchange of MB-RTS frames/signals/messages and MB-CTS frames/signals/messages reserves the medium for a period of time to transmit data and management frames. The MB-RTS frames/signals/messages and MB-CTS frames/signals/messages contain a duration/ID field that specifies a period of time for which the medium is to be reserved for a transmission opportunity (TXOP). The TXOP is an interval of time when a particular STA has the right to initiate one or more frame/packet/data transmissions or frame/packet/data exchange sequences over the wireless medium. A TXOP is defined by a starting time and a maximum duration. The value of the duration/ID field in a MB-RTS frame/message/signal is set to be the remaining duration of the TXOP that the originating STA desires to reserve the medium. It includes the time required to transmit the K MB-CTS frames/signals/messages (MCP period), inter-frame guard time intervals, plus the time reserved for transmitting the pending data, management frames and the response frames/packets (if there are response frames such as acknowledgement frames). The duration value in the MB-CTS frame/signal/message is the value obtained from the duration field of the immediately previous MB-RTS frame/signal/message, minus the time that has elapsed and the time required to transmit this MB-CTS frame/signal/message and the inter-frame guard time interval. That is, the duration value in the MB-CTS frame/signal/message is set to be the remaining duration of the TXOP.

All STAs within the reception range of the originating STA learn of the medium reservation through MB-RTS frame/signal/message. When a non-multicast/broadcast recipient STA (i.e. the STA that is not addressed by the MB-RTS frame/signal/message) receives a MB-RTS frame/signal/message, it updates its network allocation vector (NAV) to indicate the medium occupation/reservation time based on the information in the duration/ID field of the received MB-RTS frame/message/signal if the new/received NAV value is greater than its current NAV value. The NAV maintains a prediction of future traffic on the medium, i.e. the virtual-carrier sensing status. While the NAV is set (non-zero), the virtual carrier-sensing indication is that the medium is busy during the period while the NAV is set; when the NAV is not set (zero), the indication is the medium/channel is idle. The STAs that are out of reception range of the MB-RTS frame/signal/message may learn of the medium reservation by overhearing a MB-CTS frame/signal/message transmitted by a reply-requested station. A STA receiving a valid MB-CTS frame/signal/message updates its NAV based on the information received/overheard in the duration/ID field of the MB-CTS frame/signal/message, but only if the new/received/overheard NAV value is greater than its current NAV value and only if the frame is not addressed to the receiving STA (the STA that is not the originating STA of the MB-RTS frame/signal/message) and only if the STA did not receive the previous MB-RTS frame/signal/message. It is possible that a STA did not receive the MB-RTS frame/signal/message (e.g. due to out of the reception range of the originating STA), but does receive the MB-CTS frame/signal/message sent from one of the multicast/broadcast recipient STAs. The MB-RTS/MB-CTS mechanism may thus improve operation in situations where multiple BSSs utilizing the same channel overlap. It may also reduce the collision as STAs cannot receive MB-RTS frame/signal/message from the originating STA (i.e they are hidden nodes to the MB-RTS originator), but still know from the MB-CTS frame/signal/message about the medium's impending reservation (the overhearing STA is within the reception range of the MB-CTS frame/signal/message senders).

Figure 5:
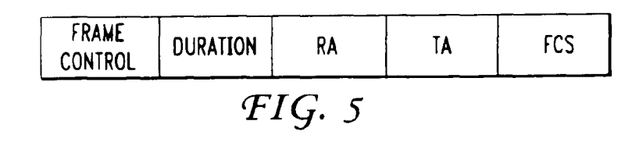
FIG. 5 shows an exemplary format of a CEL-MB-RTS frame.

In an alternative embodiment, if the originating STA receives M MB-CTS frames/signals/messages during the MCP period and $M/K<T_h$, it may optionally send a signal/control frame/management frame to cancel the previously transmitted MB-RTS frame/signal/message. This signal is called herein a cancel-multicast/broadcast-request-to-send (CEL-MB-RTS). A CEL-MB-RTS frame/message/signal contains a frame control field, a duration/ID field, a receiver address (RA) field, a transmitter address (TA) filed, a frame check sequence (FCS) field, etc. FIG. 5 shows an exemplary format of a CEL-MB-RTS frame. The frame control field identifies the frame type, frame subtype and flags. The duration/ID field contains the remaining time for which the medium is reserved or is set to zero. The RA field indicates the MAC address (multicast) of the intended receivers/destinations. The TA field indicates the MAC address of the transmitter. The FCS field is used by the receivers to check if there are errors in the received frame. Whether a STA uses this alternative embodiment can be configured. A STA receiving a CEL-MB-RTS resets its network allocation vector (NAV) if the STA used information from the previous MB-RTS frame/message as the most recent basis to update its NAV setting.

Figure 6:
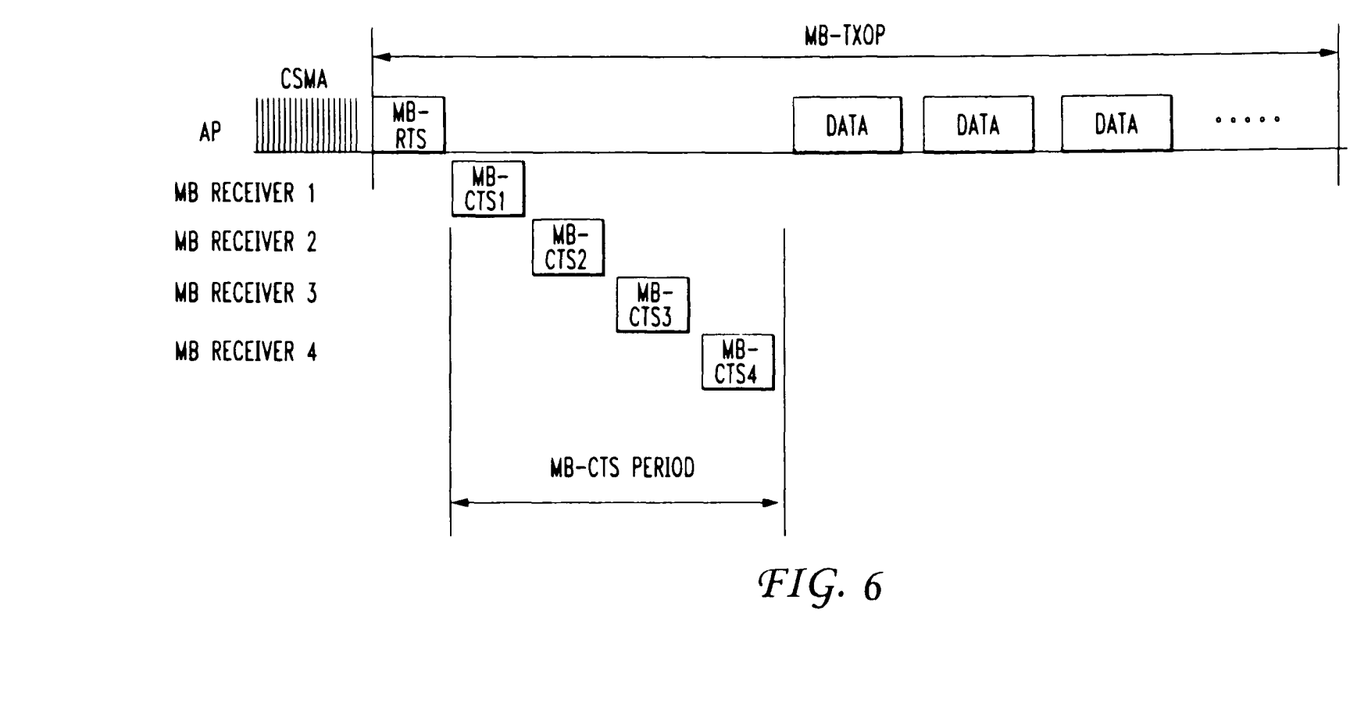
FIG. 6 shows the operation and frame exchange sequence between the originating multicast/broadcast STA and the recipient multicast/broadcast STAs in accordance to the present invention.

FIG. 6 shows the operation and frame exchange sequence between the originating multicast/broadcast STA and the recipient multicast/broadcast STAs in accordance to the present invention. For example, in a CSMA multicast/broadcast system to reserve a multicast/broadcast opportunity (MB-TXOP), an AP is associated with four multicast/broadcast receivers. The AP sends a MB-RTS frame/message/signal to reserve the medium after the AP successfully performs carrier sensing. The MB-RTS contains a list of four reply-requested STA identifiers or a bitmap control with the partial virtual bitmap to indicate four reply-requested STAs. The multicast/broadcast receivers then respond in the time slots allocated for their responses in the MB-RTS message/frame, i.e. in the order that they are specified by the list of reply-requested stations or the bitmap control and partial virtual bitmap in the MB-RTS. Multicast/broadcast receivers 1, 2, 3 and 4 each respond positively by transmitting a MB-CTS frame/message/signal. The number of MB-CTS received by the AP, M is 4. Assuming that the number of the reply-requested stations specified in the reply-requested STA identifier list or the partial virtual bitmap with the bitmap control of the MB-RTS, K is 4, and the threshold for using the reserved TXOP, $T_h$ is ¾, then, since $(M/K=4/4) \geq (T_h=¾)$, the MB-TXOP is reserved/obtained. The AP transmits the pending data/frames/packets in the reserved MB-TXOP.

Figure 7:
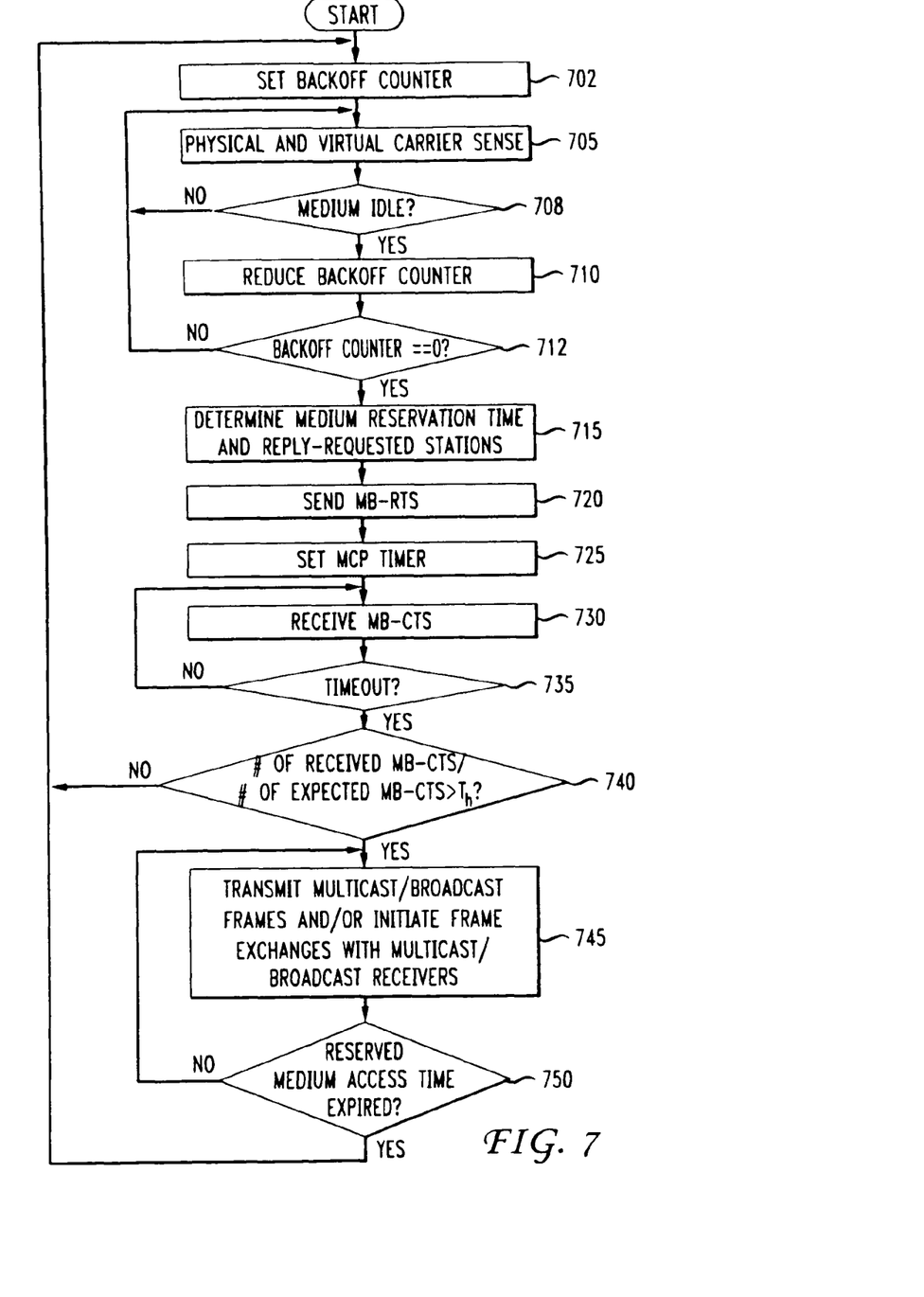
FIG. 7 is a flowchart of the operation of the originating STA to reserve the medium for multicast/broadcast transmission in accordance with the principles of the present invention.

FIG. 7 is a flowchart of the operation of the originating STA to reserve the medium for multicast/broadcast transmission in accordance with the principles of the present invention. The originating STA sets a backoff counter at 702, and performs physical and virtual carrier sensing in order to determine if the medium is idle at 705. A test is performed at 708 on the results of the carrier sensing. If the medium is not idle (the medium is busy) then the AP performs carrier sensing again. If the medium is idle, the backoff counter is reduced at 710. A test is performed at 712 on the backoff counter. If the backoff counter has not been reduced to zero then the AP performs carrier sensing again. If the backoff counter has been reduced to zero, at 715 the AP determines the medium reservation time and constructs/builds the MB-RTS frame/message/signal. The medium reservation time is the sum of the time required to transmit a MB-RTS frame/message/signal, the sum of the transmission time for the number of MB-CTS time slots and the amount of time that the AP wants to reserve the medium to transmit pending data (plus any inter-frame guard times). At 720, the AP transmits the MB-RTS frame/message/signal to its associated receivers. The AP sets a wait (MCP) timer at 725 to wait for its associated receivers to respond with MB-CTS frames. The AP receives one or more MB-CTS frames/messages/signals at 730. At 735 a test is performed by the AP/originating STA to determine if there has been a timeout of the wait (MCP) timer. A test is then performed at 740 to determine if the ratio of the number of received MB-CTS frames to the number of expected MC-CTS frames is greater than $T_h$. If the ratio of the number of the received MB-CTS frames to the number of expected MC-CTS frames is less than or equal to $T_h$ then processing proceeds to 702. If the ratio of the number of received MB-CTS frames to the number of expected MC-CTS frames is greater than $T_h$ then at 745, the AP transmits multicast/broadcast frames and/or initiates frame exchanges with its associated multicast/broadcast receivers. At 750 the AP determines if the reserved time for medium access has expired. If the medium access reservation time has expired then the AP proceeds to 702 to set a backoff time and perform carrier sensing again. If the medium access reservation time has not expired the AP continues to transmit multicast/broadcast frames and/or initiate frame exchanges with its associated receivers.

Figure 8A:
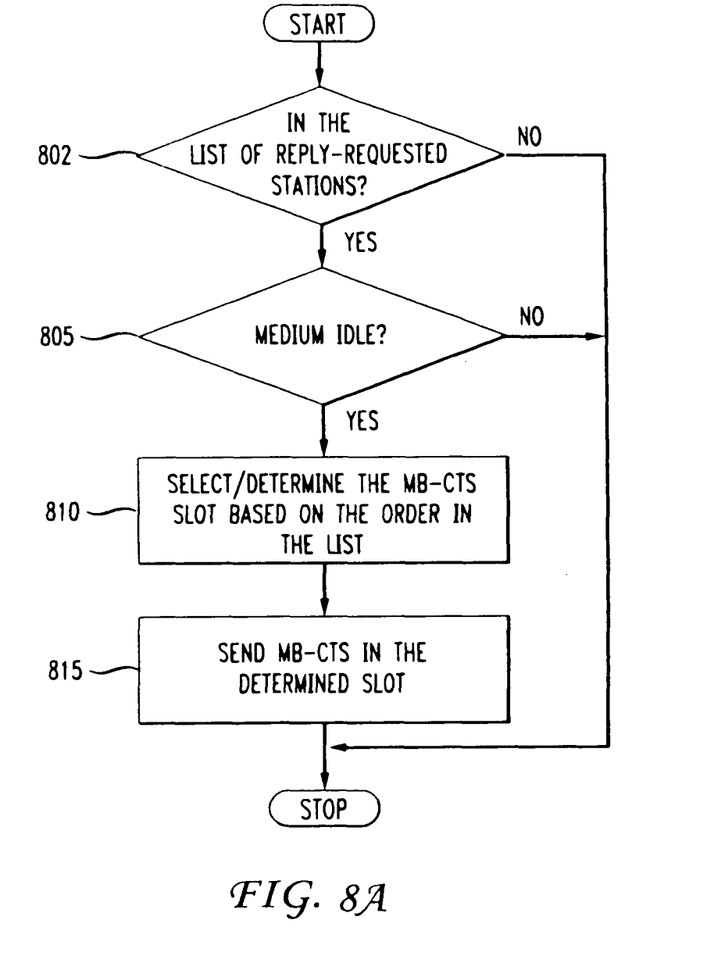
FIGS. 8A and 8B together are a flowchart of the operation of the multicast/broadcast recipient STAs in response to a MB-RTS from the originating STA in accordance with the principles of the present invention. The processing of FIG. 8B is optional.
Figure 8B:
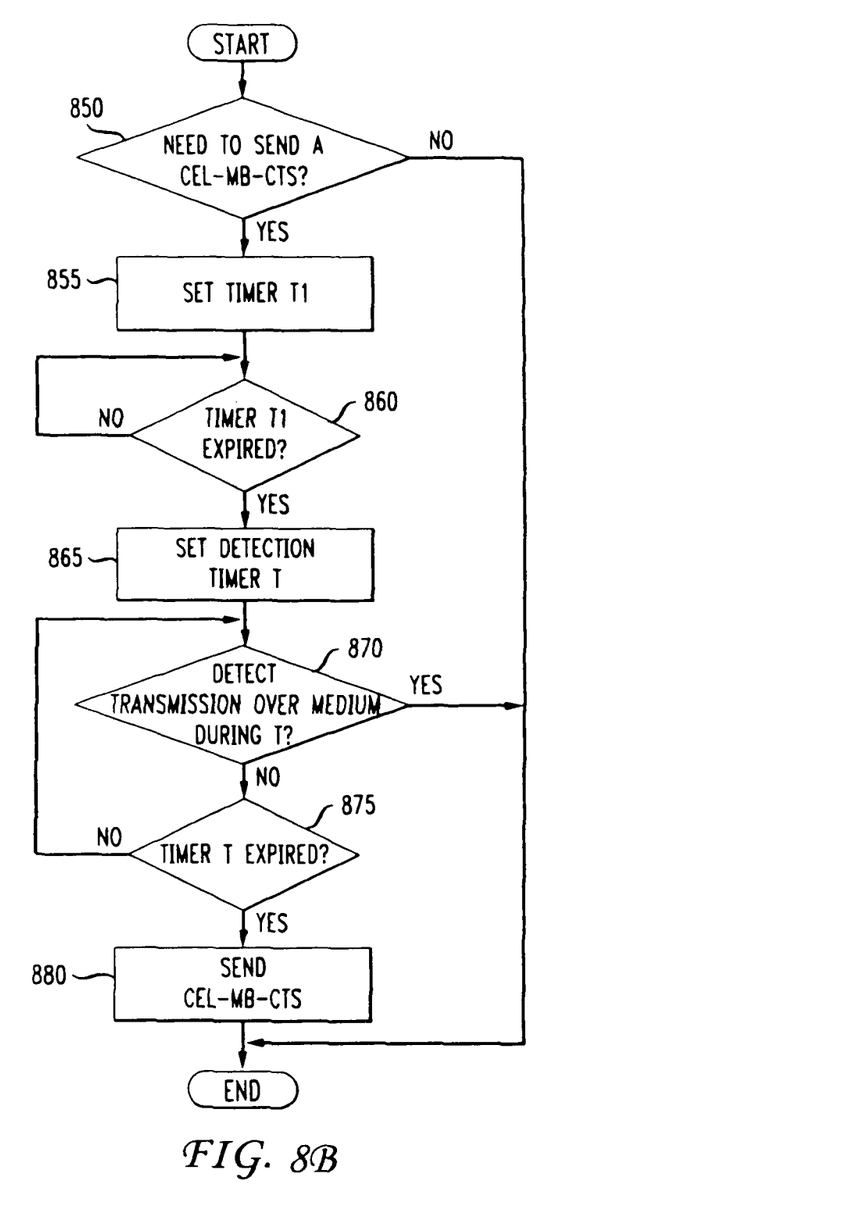

FIGS. 8A and 8B together are a flowchart of the operation of the multicast/broadcast recipient STAs in response to a MB-RTS from the originating STA in accordance with the principles of the present invention. The processing of FIG. 8B is optional. At 802 the recipient STA performs a test to determine if it is in the list of reply-requested stations. If the recipient STA is in the list of reply-requested stations, then at 805 the medium is tested to determine if it is idle. If the medium is idle then a determination/selection of the MB-CTS slot is made at 810 based on the order in the list of reply-requested stations in the received MB-RTS signal/frame/message. At 815 a MB-CTS message/frame/signal is sent/transmitted to the originating STA of the MB-RTS frame/signal/message in the determined slot. If the medium is not idle/busy then, processing stops. If the recipient station is not in the list of reply-requested stations then, processing stops.

FIG. 8B as indicated above is optional. That is, based on policy or configuration it is optional whether a cancellation message/frame/signal (CEL-MB-CTS) is sent if after sending a MB-CTS message/frame/signal the STA determines that the medium is not used by the originating STA of the MB-RTS (e.g. if no frame is transmitted over medium during detection period). At 850 a determination is made whether to send a CEL-MB-CTS message/frame/signal. If a determination is made to send a CEL-MB-CTS message/frame/signal then at 855 timer T1 is set/initialized. At 860 timer T1 is tested and a tight loop is executed until timer T1 expires. Once timer T1 expires then at 865 detection timer T is set. A test is performed at 870 to determine if there are/have been any transmissions during interval T. If there have not been any transmissions during interval T, then a test is performed at 875 to determine if interval T has expired. If interval T has expired then a CEL-MB-CTS message/frame/signal is sent/transmitted at 880. If a determination is made not to send a CEL-MB-CTS message/frame/signal then processing ends. If there was a transmission during interval T then processing ends. If timer T has not expired then processing continues at 870.

A STA that used information from the MB-RTS frame/message/signal as the most recent basis to update its NAV setting is permitted to reset its NAV if no physical layer transmission is detected during a time period T starting at the time T1 and ending at the time T2 (T=T2−T1). T1 can be calculated as the time that the MB-RTS frame was received+K (# of MB-CTS slots)*(MB-CTS_Time)+the time for all inter-frame guard intervals. T2 is equal to T1+wait_time. MB-CTS_Time is the time to transmit a MB-CTS frame/message/signal. Wait_time is a parameter to wait to make sure that there is no transmission over the medium. The MB-CTS_Time is calculated using the size of the MB-CTS frames/signals/messages and the data rate at which the MB-RTS frame/message/signal used for the most recent NAV update was received.

A STA that has sent a MB-CTS in response to the MB-RTS may optionally send a signal/control frame/management frame to cancel the previously transmitted MB-CTS if no physical layer transmission is detected during the above time period T starting at the time T1 and ending at the time T2 (T=T2−T1). Herein this signal/message/frame is called a cancel-multicast/broadcast-clear-to-send (CEL-MB-CTS). A CEL-MB-CTS frame contains a frame control field, a duration/ID field, a receiver address (RA), a frame check sequence (FCS). The frame control field identifies the frame type, frame subtype and flags. The duration/ID field gives the remaining time that the medium is reserved or is set to zero. The RA field indicates the MAC address of the intended receivers/destinations, which is the MAC address of the MB-RTS originator.

Figure 9:
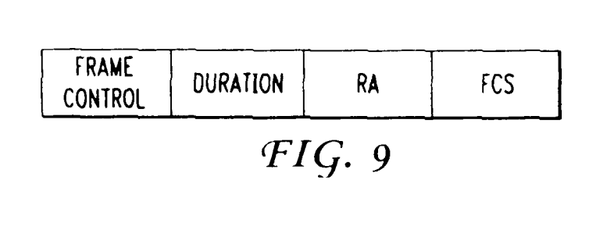
FIG. 9 shows an exemplary format of a CEL-MB-CTS frame.

FIG. 9 shows an exemplary format of a CEL-MB-CTS frame. Whether to send the optional CEL-MB-CTS frame can be configured on a per-STA basis. A STA receiving a CEL-MB-CTS resets its NAV if the STA used information from the previous MB-CTS frame as the most recent basis to update its NAV setting.

In an alternative embodiment, A STA that has sent a MB-CTS in response to the MB-RTS may optionally send a signal/control frame/management frame to cancel the previously transmitted MB-CTS if this STA reset its NAV after receiving a CEL-MB-RTS that is not addressed to it.

Figure 10:
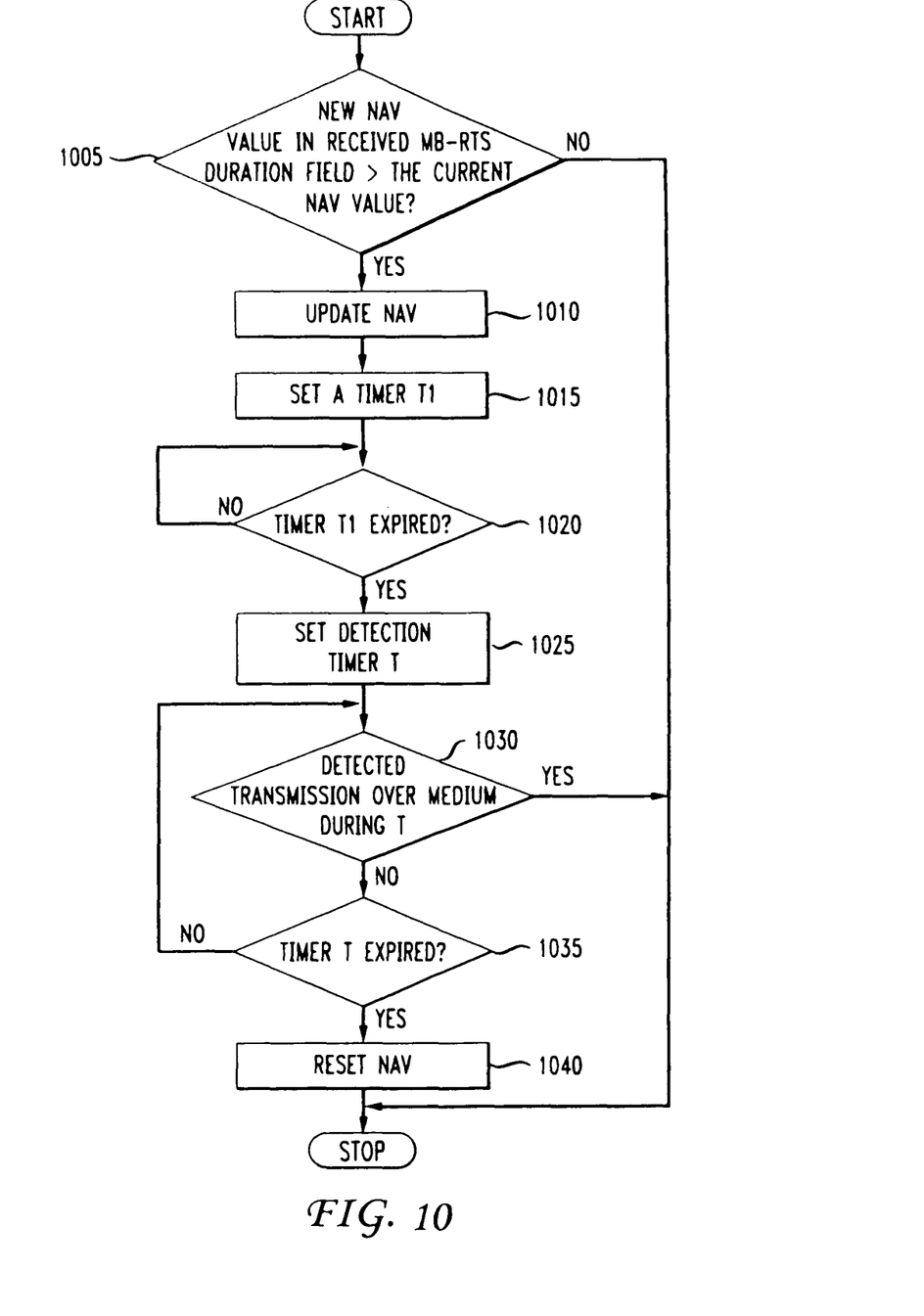
FIG. 10 is a flowchart of the operation of a STA receiving a MB-RTS frame/message/signal when the STA is neither the originator nor the receiver/destination of the MB-RTS message/signal/frame.

FIG. 10 is a flowchart of the operation of a STA receiving a MB-RTS frame/message/signal when the STA is neither the originator nor the receiver/destination of the MB-RTS message/signal/frame. At 1005 a test is performed to determine if the NAV value in the MB-RTS message/signal/frame duration field is greater than the NAV value that the STA currently has stored. If the new NAV value in the MB-RTS message/signal/frame duration field is greater than the NAV value that the STA currently has stored then the current NAV value that the STA has is updated to the NAV value in the received MB-RTS frame/signal/message at 1010. If the new NAV value in the MB-RTS message/signal/frame duration field is less than or equal to the NAV value that the STA currently has stored, then processing stops. At 1015 a timer T1 is set. At 1020 a test is performed to determine if timer T1 has expired. If timer T1 has not expired then processing continues in a tight loop on itself until timer T1 expires. At 1025 detection timer T is set. A test is performed at 1030 to determine if transmission has been detected over the medium/channel during time interval T. If transmission has been detected over the medium/channel during time interval T, then processing stops. If no transmission has been detected over the medium/channel during time interval T, then a test is performed at 1035 to determine if timer T has expired. If timer T has not expired, then processing continues at 1030. If timer T has expired, then the NAV value is reset at 1040 to the previous value before updating with the received MB-RTS minus/less the time that has passed.

Figure 11:
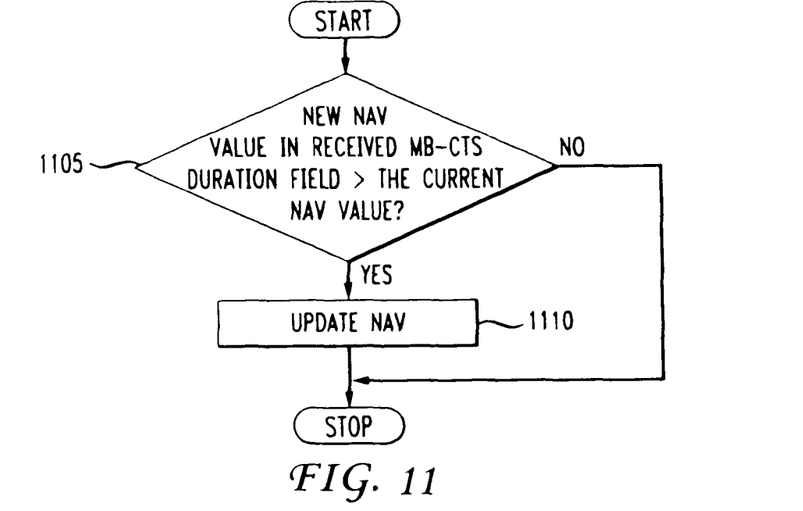
FIG. 11 is a flowchart of the operation of a STA receiving a MB-CTS signal/message/frame when the MB-CTS frame/message/signal is not addressed to the receiving STA and the STA did not receive the previous MB-RTS message/frame/signal.

FIG. 11 is a flowchart of the operation of a STA receiving a MB-CTS signal/message/frame when the MB-CTS frame/message/signal is not addressed to the receiving STA and the STA did not receive the previous MB-RTS message/frame/signal. At 1105 a test is performed to determine if the new NAV value in the received MB-CTS duration field is greater than the NAV value that the STA currently has stored. If the new NAV value in the received MB-CTS message/frame/signal duration field is greater than the NAV value that the STA currently has stored, then the current NAV value that the STA has is updated to the NAV value in the received MB-CTS frame/signal/message at 1110. If the new NAV value in the received MB-CTS message/frame/signal duration field is less than or equal to the NAV value that the STA currently has stored, then processing stops.

Figure 12:
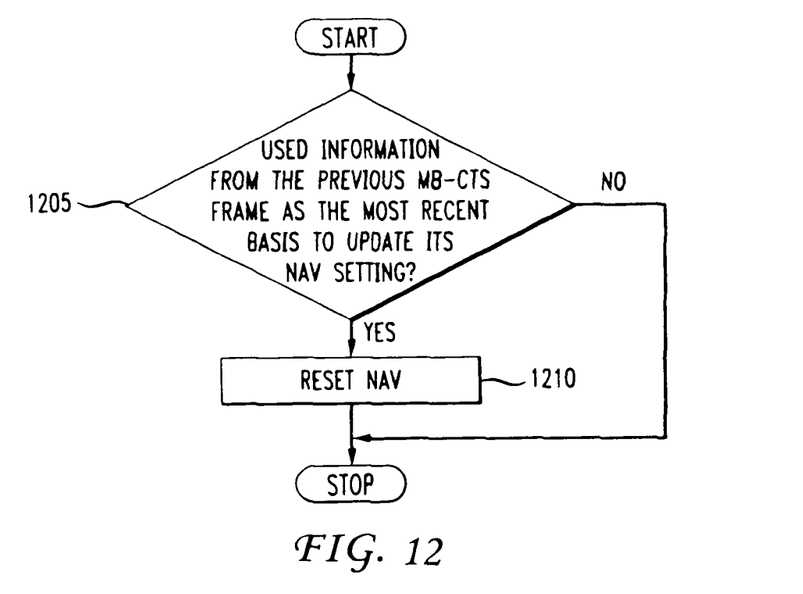
FIG. 12 is a flowchart of the operation of a STA receiving a CEL-MB-CTS frame/message/signal when the STA is not the STA addressed by this CEL-MB-CTS message/signal/frame.

FIG. 12 is a flowchart of the operation of a STA receiving a CEL-MB-CTS frame/message/signal when the STA is not the STA addressed by this CEL-MB-CTS message/signal/frame. At 1205 a test is performed to determine if the STA used information from the previous MB-CTS frame/message/signal as the most recent basis to update its NAV value. If the STA used information from the previous MB-CTS as the most recent basis to update its NAV value, then the STA resets its NAV value to the previous value before updating with the MB-CTS minus/less the time that has passed. If the STA did not use information from the previous MB-CTS as the most recent basis to update its NAV value, then processing stops.

The present invention can also be used for a station (STA includes stations and APs) to reserve the medium and distribute the medium reservation information for multicast and broadcast transmissions in a wireless mesh network, an ad hoc network or an independent basic service set (IBSS). It can be used for peer-to-peer multicast among the stations. The station can use the method in the present invention to access the channel for transmitting multicast data to other stations, for example in video conferencing or other peer-to-peer services.

Figure 13:
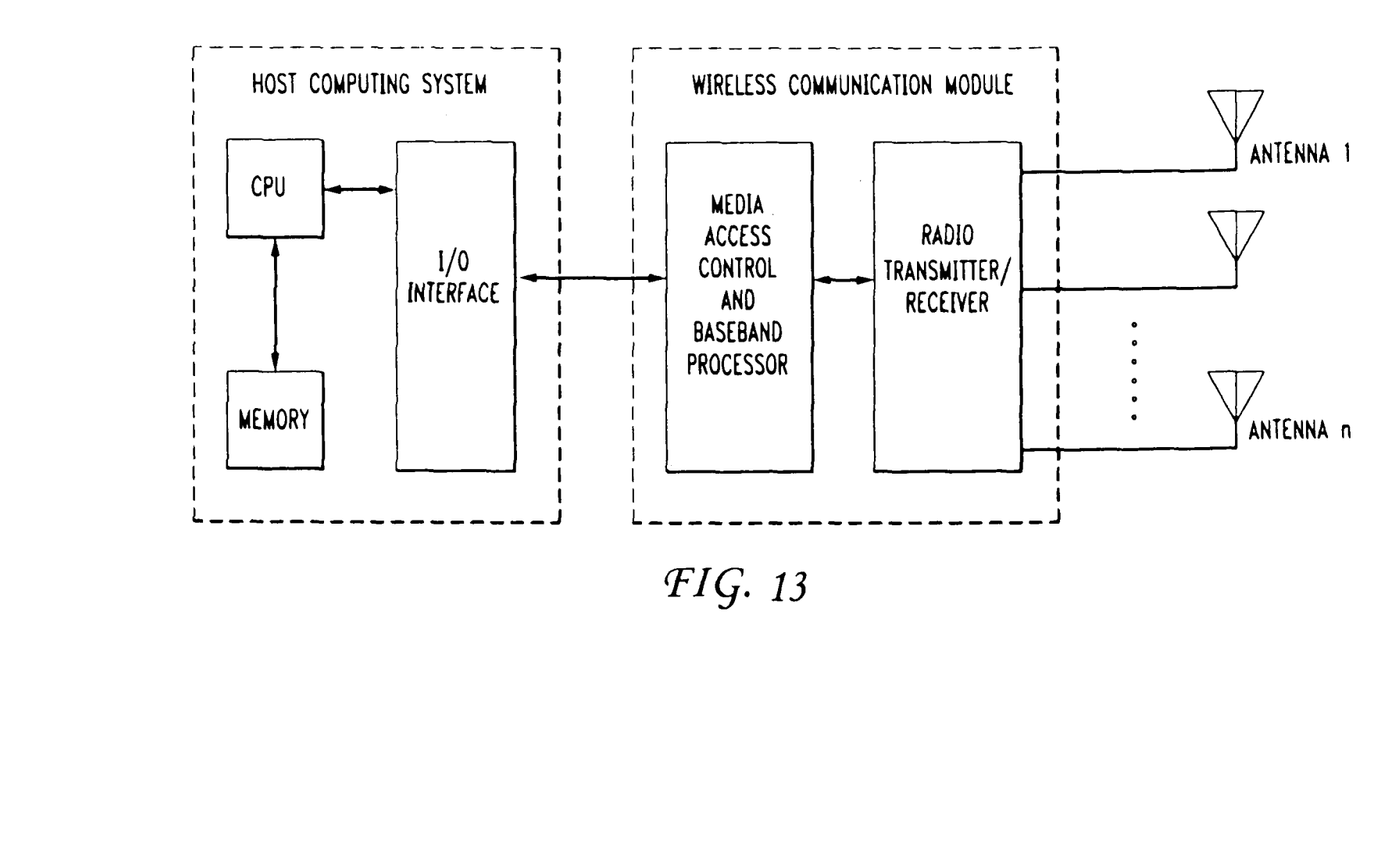
FIG. 13 is a block diagram of an exemplary implementation of the present invention.

Referring now to FIG. 13, which is a block diagram of an exemplary implementation of the present invention. Since a STA and/or AP (which is a special STA) can be a transmitter, a receiver or a transceiver, a single block diagram is used showing a wireless communication module having a radio transmitter/receiver. That is, the radio transmitter/receiver can be a transmitter, a receiver or a transceiver. The present invention includes a host computing system and a communication module (wireless). The host processing system can be a general-purpose computer or a specific-purpose computing system. The host computing system can include a central processing unit (CPU), a memory and an input/output (I/O) interface. The wireless communication module can include a MAC and baseband processor, radio transmitter/receiver, and one or more antennas. An antenna transmits and receives the radio signals. The radio transmitter/receiver performs radio signal processing. The MAC and baseband processor performs MAC control and data framing, modulation/demodulation, coding/decoding for the transmission/receiving. At least one embodiment of the present invention can be implemented as a routine in the host computing system or wireless communication module to process the transmission and receiving of data and control signal. That is, the block diagram of FIG. 13 may be implemented as hardware, software, firmware, a field programmable gate array (FPGA), an application specific integrated circuit (ASIC), a reduced instruction set computer (RISC) or any combination thereof. Further, the exemplary processes illustrated in the various flowcharts and text above are operationally implemented in either the host processing system or the wireless communication module or a combination of the host processing system and the communication module. The block diagram thus fully enables the various methods/processes to be practiced in hardware, software, firmware, a field programmable gate array (FPGA), an application specific integrated circuit (ASIC), a reduced instruction set computer (RISC) or any combination thereof.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s).

The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. An apparatus comprising:
a receiver that receives a multicast digital message and a device that processes the received multicast digital message, the multicast digital message having a format comprising:
a duration field;
a multicast receiver address field;
a multicast transmitter address field; and
bits specifying destination receivers that are requested to reply to the multicast digital message, wherein the bits specifying destination receivers comprise a first field having an offset (N) and a second field having a bitmap with bits of position (i) corresponding to specific destination receivers with respect to the offset, wherein when a destination receiver with an association identifier of 16×N+i is indicated, then the indicated destination receiver is requested to reply to the multicast digital message; and
wherein the destination receivers that are requested to reply respond to the multicast digital message in time slots allocated for their respective responses.

2. The apparatus of claim 1, wherein the multicast digital message comprises a multicast request-to-send message to reserve time in a communication medium to receive multicast data.

3. The apparatus of claim 1, further comprising a frame control field, wherein the frame control field comprises a frame type identification, and the duration field comprises information representing a reservation time for a communication medium.

4. A station apparatus on a wireless network, the station apparatus comprising:
a receiver that receives a multicast digital message from a transmitter node on the wireless network, and a device that processes the received multicast digital message, the multicast digital message used to cancel a previously received multicast request-to-send message, the multicast digital message having a format comprising:
a duration field;
a multicast receiver address field; and
a multicast transmitter address field;
wherein the multicast digital message acts to cancel the previously received multicast request-to-send message, the previously received multicast request-to-send message comprising at least one field specifying receive destinations that are expected to respond to the multicast request-to-send message by transmitting multicast clear-to-send message responses, wherein the multicast digital message is received after the transmitter node receives less than a threshold ratio of a number of multicast clear-to-send message responses from the receive destinations to a number of the receive destinations that are expected to respond to the multicast request-to-send message.

5. A non-transitory computer program storage device containing computer instructions which, when executed by a processor, enable processing of a received multicast digital message, the computer instructions performing acts of:
processing a duration field, a multicast receiver address field, and a multicast transmitter address field of the received multicast digital message; and
processing bits of the received multicast digital message specifying destination receivers that are requested to reply to the received multicast digital message, wherein the bits specifying destination receivers comprise a first field having an offset (N) and a second field having a bitmap with bits of position (i) corresponding to specific destination receivers with respect to the offset, wherein when a destination receiver with an association identifier of 16×N+i is indicated, then the indicated destination receiver is requested to reply to the received multicast digital message, such that the destination receivers that are requested to reply respond to the received multicast digital message in time slots allocated for their respective responses.

6. The non-transitory storage device of claim 5, wherein the message comprises a multicast request-to-send message to reserve time in a communication medium to receive multicast data.

7. The non-transitory storage device of claim 5, wherein the received multicast digital message further comprises a frame control field, wherein the frame control field comprises a frame type identification, and the duration field comprises information representing a reservation time for a communication medium.

8. A non-transitory computer program storage device containing computer instructions which, when executed by a processor, enable processing of a multicast digital message received from a transmitter node on a wireless network, the executed computer instructions performing acts of:
processing a duration field comprising information representing a remaining time that a communication medium is reserved, a multicast receiver address field, and a multicast transmitter address field of the multicast digital message, such that the multicast digital message acts to cancel a previously received multicast request-to-send message, the previously received multicast request-to-send message comprising at least one field specifying receive destinations that are expected to respond to the multicast request-to-send message by transmitting multicast clear-to-send message responses, wherein the multicast digital message is received after the transmitter node receives less than a threshold ratio of a number of multicast clear-to-send message responses from the receive destinations to a number of the receive destinations that are expected to respond to the multicast request-to-send message.

* * * * *